Patented May 9, 1950

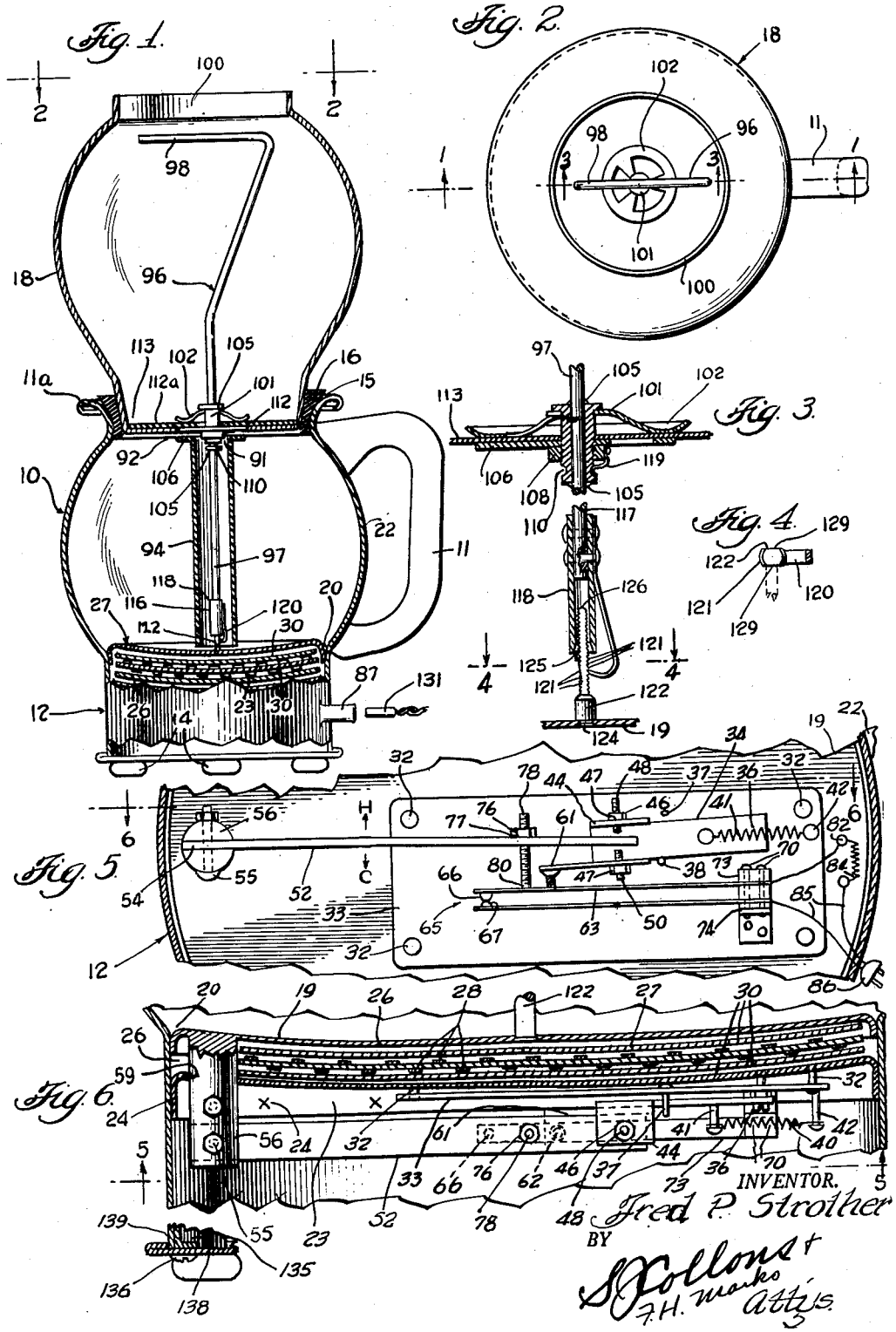

2,507,283

UNITED STATES PATENT OFFICE 2,507,283

COFFEE MAKER

Fred P. Strother, Minneapolis, Minn., assignor to Sears, Roebuck and Co., Chicago, Ill., a corporation of New York Original application August 1, 1942, Serial No. 453,198, now Patent No. 2,386,278, dated October 9, 1945. Divided and this application May 21, 1945, Serial No. 595,026

2 Claims. (Cl. 99—292)

This is a division of my Patent No. 2,386,278, granted October 9, 1945, entitled "Coffee maker."

An important object of the invention is to provide a coffee maker having a novel construction and arrangement of parts.

A further object is to provide a novel releasable filter-locking assembly.

It is also an object to provide novel filter-removing means.

Further objects and advantages of my invention will appear as the description proceeds.

The invention will be understood better upon reference to the following description and the accompanying drawing, in which:

Fig. 1 is a vertical sectional view of an illustrative coffee maker built in accordance with the invention, taken as indicated by the line 1—1 in Fig. 2;

Fig. 2 is a plan view taken as indicated by the line 2—2 in Fig. 1;

Fig. 3 is an enlarged fragmentary sectional view taken as indicated by the line 3—3 in Fig. 2;

Fig. 4 is a sectional plan view taken as indicated by the line 4—4 in Fig. 3;

Fig. 5 is an enlarged fragmentary plan sectional view taken as indicated by the line 5—5 in Fig. 6;

Fig. 6 is a fragmentary vertical sectional view taken as indicated by the line 6—6 in Fig. 5.

Referring now more particularly to the drawing, there is shown for illustrative purposes a lower pot 10 having a suitable preferably heat-insulating handle 11 and pouring spout 11a, and a base 12 with four or any other suitable number of heat-insulating feet 14 and a large mouth 15 embracing a rubber or other suitable gasket ring 16 by means of which an upper pot 18 is supported. The lower pot 10 has a heat conducting plate floor 19 soldered or brazed as at 20 or otherwise suitably connected to the side wall 22 of said lower pot, and spaced therebelow a disc or pressure plate 23 spot-welded as at 24 or otherwise suitably connected to said side wall. The resulting space 26 is occupied by an electric resistance heating unit 27 such as a wire 28 wound about and between upper and lower mica sheets 30 suitably held in assembly with the pot 10, said sheets being portions of a wrapper or envelope if desired and insulated electrically from said pot, etc.

Secured to and under the disc 23 as by screws 32 (Figs. 5 and 6) is a supporting plate 33 to which a toggle lever 34 is pivoted as at 36, said lever being urged selectively toward one or the other of two stops 37 and 38 by a spring 40 anchored at 41 to the lever at one side of the pivot and at 42 to the plate 33 at the opposite side of the pivot.

The lever 34 has depending ears 44 and 45 to which nuts 46 may be fastened or welded as at 47 to receive screws 48 and 50, respectively, adapted to be adjusted toward and away from each other. Disposed in lost motion relation to and between the screws 48 and 50 is the free end 51 of a thermostat bimetal 52 whose other end 54 is anchored as at 55 by a screw or rivet between the fork arms 56 of a heat transferring stud 58 depending from the hot plate 19 through an opening 59 in the disc 23. The ear 45 has an extension 61 carrying a porcelain or other insulation pin 62 engageable with the movable spring arm 63 of a switch 65 to close the same, the switch being however normally open. The arm 63 has a contact 66 engageable with a contact 67 on a second spring arm 69 of the switch, the other ends of said arms being anchored as at 70 between and separated by suitable insulating blocks 71 held between a plate 73 and a bracket 74 carried by the plate 33. A nut 76 welded or fastened as at 77 or otherwise secured adjacent the free end 51 of the bimetal 52 receives a screw 78 having a porcelain or other insulating end 80 engageable with the switch arm 63 to close the switch. One of the switch arms 63 and 69 is wired as at 81 to one terminal 82 of the heating element 28 and the other switch arm and the other terminal 84 of the heating element 28 are wired as at 85 to prongs 86 suitably secured to and insulated from the base housing 12 and shielded by a shell or socket 87 (Fig. 1).

The upper pot 18 has a floor 90 open centrally as at 91 and has brazed as at 92 or otherwise suitably secured thereat a tube 94 adapted to terminate short of the floor 19 of the lower pot. A rod 96 is provided, having a stem 97 adapted to be received in the tube 94 and having a handle 98 arranged to be grasped and manipulated conveniently through the mouth 100 of the upper pot. A ferrule 101 about the stem 97 and having a dished spring spider or other suitable perforated member 102 welded or otherwise fastened thereto is held against longitudinal displacement by abutments 105 which may be upset from the stem. A pressure plate 106 also in the form of a spider or other suitable perforated member may be integral with or suitably fastened to a sleeve 108 adapted to be telescopically assembled with the ferrule 101 and to be releasably held in a predetermined relation with the spring member 102 under tension of the latter by means of a snap spring or pawl 109 releasably received in a circumferential groove 110 in the ferrule. The plate 106 is adapted to seat in the central depression 112 in the floor 90 of the upper pot, with the upper surface of said plate substantially flush with the adjacent upper surface 112a of the floor 90. A cloth or other suitable filter 113 is adapted to be resiliently clamped between the spiders 102 and 106 and to rest on the floor 90, the filter having a central hole 114 substantially in register with the bore of the spider 106 and its sleeve 108.

Secured as at 116 to the lower end 117 of the stem 97 is a sleeve 118 carrying a spring pawl 120 cooperative with teeth 121 on a ratchet stud 122 centrally secured as at 124 to and projecting up from the floor 19 of the lower pot 10. The lower end of the tube 118 is preferably flared or belled as at 125 and the top 126 of the stud is preferably rounded to guide the tube over and about the stud as the tube descends, the top of the stud also readily camming the pawl 120 aside as the latter descends. The stud is flattened at one or opposite sides 129 to afford in effect a plurality of bayonet joint adjustments with the pawl 120. Thus, as the pawl 120 descends it may snap over the teeth 121 or it may be disposed as shown in dotted lines in Fig. 4, 90° from the position shown in full lines, until the lower spider 106 is seated in the depression 112, and then, if in the dotted line position, it is turned 90° to engage the appropriate ratchet tooth whereby to releasably lock the filter assembly in operative position and also releasably lock the two pots together. The upper spider 102 is sufficiently resilient to enable the user to press it down until the pawl engages a tooth low enough to insure against any looseness or rattling of parts. Rotation of the handle 98 90° from the full line position will release the pawl and allow the assembly to be removed. The inside diameter of the lower spider 106, sleeve 108 and filter are such as to enable them to slip past the spring 120 and tube 118, whereby an old filter may be readily replaced by a new one. The entire filter ensemble is removable and insertable through the mouth 100 of the upper pot 18.

As seen in Fig. 5, the thermostat 52 moves in the direction C as it cools and in the direction H as it heats. Accordingly, when the device is cold the thermostat button 80 is in engagement with the switch arm 63 and holds said arm against its spring resistance (and possibly also the spring resistance of the arm 69) in the position shown, wherein the contacts 66 and 67 are engaged and hence the switch 65 is closed. At such time, also, the toggle lever 61 is on the near side of dead center, i. e., the side on which the stop pin 38 is disposed, where the lever is held by the toggle spring 43, which accordingly holds the button 62 against the switch arm 63 in switch-closing position.

In making coffee with this apparatus, the plug socket 131, connected to a wall socket (not shown), is plugged in at 87 to the prongs 86, projecting from the base 12, to supply electric energy to the heating element 28. As the temperature of the hot plate 19 rises, the water in the lower pot 10 steams. At the same time, the bimetal 52, becoming warm, moves in the direction H, and may become free of the switch arm 63 but does not move sufficiently to withdraw the button 62 sufficiently to allow the arm 63 to spring open. The steam ultimately drives the liquid up the tube 94, and thereafter, due to the reduction of water to be heated by the hot plate 19, the temperature of the plate rises rapidly, as does also that of the bimetal 52, which engages the pin 48 and promptly trips the lever 34 past dead center into engagement with the stop 37, the switch arm 63 at such time springing to open-switch position.

After the ground coffee over the filter 113 in the upper chamber or pot 18 is flooded, the vacuum caused by the condensing steam in the lower pot causes the coffee liquor to descend to the lower compartment or pot 10 and form coffee suitable for drinking. After the opening of the switch 65 the hot plate 19 and consequently the thermostat 52 starts to cool. The calibration is such that when the temperature of the coffee in the lower compartment 10 has dropped to approximately 180° F., for example, the adjustable porcelain-tipped point 80 has engaged the switch arm 63 and moved it to switch-closing position, without however having moved the lever 34 at all or at any rate sufficiently to trip the lever past dead center. The temperature of the coffee accordingly again rises, but when it has reached approximately 185° F., for example, the bimetal 52 has again retrogressed to a point enabling the switch arm 63 to spring open. The consequent cooling restarts a series of these cycles whereby the temperature of the coffee may be maintained indefinitely at a proper temperature between say 180° F. and 185° F. for serving.

When the socket plug 131 is withdrawn from the coffee maker, thereby disconnecting the latter from the line, the bimetal 52 cools and moves into engagement with the point 50 on the lever 34 which, at a temperature of approximately 125° F., for example, trips past dead center and forces the switch arm 63 into switch-closing position, as shown in Fig. 5, ready for repeating the above-explained operation upon reconnection with the line for making another pot of coffee and retaining it at the desired temperature for serving.

It is evident from the foregoing that with my construction the human element is eliminated since there is nothing to preset in order to place the appliance in operation.

The parts may be readily calibrated or constructed to open and close the switch at any desired temperatures. All calibrations may be made at the factory and thereupon all screws may be soldered or brazed in place.

The feet 14 may be mounted on a base plate 135 which may be attached as by screws 136 to lugs or other means 138 spot-welded as at 139 or otherwise suitably attached to the heating element housing.

The filter unit is assembled by slipping a filter cloth and thereafter the lower spider 106 with its sleeve 108 past the pawl 120 until the spring 109 snaps into the groove 110, thereby resiliently clamping the filter cloth against the spring spider 102. To remove the cloth this procedure is reversed, the spring 109 readily snapping out of the groove 110 upon being pulled down by the user.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. In an apparatus for brewing coffee, a bottom containing vessel shaped with a constricted mouth opening uppermost thereof, a top containing vessel having a base portion shaped to be received in snug-fitting nested relation within said constricted mouth opening of said bottom vessel and having a fluid permeable partition constituting a bottom wall thereof with a central opening in said bottom wall, in combination with a device for releasably securing together said top and bottom vessels comprising a vertical stud anchored in the floor of said bottom vessel, said stud having certain of its vertical element surfaces smooth and other of its vertical element surfaces serrated with ratchet teeth formations of which the perpendicular tooth edges are lowermost, and a coupling rod rotatably journaled in said central hole of said permeable partition bent at its upper end, whereby to afford manipulation, and provided at its lower end with an opening for admitting said anchored stud, and carrying a springable latching claw that may be yieldably ratcheted downwardly over the serrations of said stud and in so doing have biting engagement with its said lowermost edges, and whereby upon being rotated by said manipulation bent portion to be disposed free of engagement with said serrations for affording freedom for disassembly to said bottom and top vessels.

2. The combination set forth in claim 1 in which said coupling rod is provided at its lowermost extremity with a coupling sleeve whose opening is shaped with a flared mouth to assist in guiding said stud and in which the cross section of said opening conforms with that of said stud in order to establish predetermined alignments therebetween.

FRED P. STROTHER.

REFERENCES CITED

The following references are of record in the file of this patent:

UNITED STATES PATENTS

| Number | Name | Date |
|---|---|---|
| 997,845 | Omara | July 11, 1911 |
| 1,590,968 | Forman | June 24, 1926 |
| 1,984,047 | Thieme | Dec. 11, 1934 |
| 1,989,034 | Anderson et al. | Jan. 22, 1935 |
| 2,046,710 | Umstott | July 7, 1936 |
| 2,069,939 | Browning | Feb. 9, 1937 |
| 2,083,450 | Kauffman | June 8, 1937 |
| 2,164,158 | Masin | June 27, 1939 |
| 2,345,262 | Jepson et al. | Mar. 28, 1944 |
| 2,345,265 | Jepson et al. | Mar. 28, 1944 |